(12) United States Patent
Min

(10) Patent No.: US 6,690,591 B2
(45) Date of Patent: Feb. 10, 2004

(54) SINGLE STAGE CONVERTER IN LCD BACKLIGHT INVERTER

(75) Inventor: Byoung Own Min, Suwon-shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/177,867

(22) Filed: Jun. 20, 2002

(65) Prior Publication Data

US 2003/0169604 A1 Sep. 11, 2003

(30) Foreign Application Priority Data

Mar. 8, 2002 (KR) ........................................ 2002-12321

(51) Int. Cl.[7] ............................................... H02M 3/24
(52) U.S. Cl. ....................................................... 363/97
(58) Field of Search ........................... 363/21.02, 21.03, 363/21.15, 21.16, 59, 58, 60, 95, 97, 25; 315/219, 224, 225, 307, 158, 151

(56) References Cited

U.S. PATENT DOCUMENTS 5,486,992 A * 1/1996 Koscica et al. ................ 363/58
5,923,129 A * 7/1999 Henry ......................... 315/307

* cited by examiner

Primary Examiner—Rajnikant B. Patel
(74) Attorney, Agent, or Firm—Darby & Darby

(57) ABSTRACT

Disclosed is about a single stage converter in an LCD backlight inverter which is embodied into an integrated circuit and has an individual circuit structure for converting DC current into AC current. The single stage converter in the LCD backlight inverter of the invention is embodied as an ASIC to realize an individual application circuit, replaces conventional two-stage articles to reduce the size, enhances the efficiency and reduces the part number thereby saving the cost for materials.

4 Claims, 5 Drawing Sheets

Current Waveform

OUT Gate Waveform

Current Waveform

OSC Operation Waveform

SINGLE STAGE CONVERTER IN LCD BACKLIGHT INVERTER

BACKGROUND OF THE INVENTION

1. Field of the Invention

The present invention relates to an LCD backlight inverter, and more particularly, to a single stage converter in an LCD backlight inverter, which is embodied into an integrated circuit and has an individual circuit structure for converting DC current into AC current.

2. Description of the Related Art

In general, inverters are inverse transforming apparatuses for converting DC current into AC current. The inverters are widely used in various types, examples thereof include those having a DC motor associated with an AC generator; those using a vibrator, those using a discharge tube, and currently those using a transistor or thyristor.

The above inverters are generally used as a portable AC power source, a fluorescent lamp power source of a vehicle, an emergency power source, a backlight power source for an LCD or other display devices and the like.

It will be described about a structure of the above LCD backlight inverter in reference to FIG. 1.

FIG. 1 illustrates a structure of important parts of a general LCD backlight inverter, in which a DC/AC converter 10 performs transformation in a circuit, and a buck switch (not shown) is connected between a power supply VCC and the DC/AC converter 10 to determine power supply.

The buck switch is on/off controlled in response to an output signal of a driving block 20, which controls the operation of the DC/AC converter 10 so as to convert a DC power into an AC power as shown in FIG. 1.

The power converted into the AC high voltage according to the operation of the DC/AC converter 10 is applied to a downstream lamp so that the downstream lamp lights up. The power via the lamp functioning as a feedback signal F/B is inputted into an inversion (−) terminal of an error amplifier ERR1 constituting a detection signal judging block 40.

The error amplifier ERR1 compares the feedback signal F/B inputted into the inversion (−) terminal with a reference voltage inputted into a non-inversion (+) terminal so as to transmit a compared result into the driving block 20.

Describing the operation of the above structure according to an important function, opening the lamp downstream of the DC/AC converter 10 converts the feedback signal F/B into a low state so that the inverter operates to elevate the voltage in an output terminal a of the error amplifier ERR1.

Since elevating the voltage in the output terminal a of the error amplifier ERR1 generates an overvoltage in the second side of the DC/AC converter, it is necessary to control the inverter so as not to generate a voltage at a predetermined level or more.

Therefore, the elevated voltage in the output terminal a of the error amplifier ERR1 is divided via the first resistance R1 and the second resistance R2, and then transferred into an inversion terminal OLP of a comparator Comp1. The comparator Comp1 compares the input voltage with a reference voltage Va applied to a non-inversion terminal thereof to output a compared value so as to control the overvoltage in the second side by controlling the duty of the driving block 20, i.e. the voltage of the output terminal a of the error amplifier ERR1 which is commonly bound to the output terminal of the comparator Comp1.

The LCD backlight inverter operating as above is designated as a so-called single stage type, which has currently become popular compared to a conventional 2-stage type.

Therefore, at the current tendency that the inverters are rapidly adopting the single stage type, the necessity is increasingly growing for realizing an individual circuit while more elevating the efficiency thereof.

SUMMARY OF THE INVENTION

Accordingly the present invention has been made to solve the above problems of the prior art and it is an object of the invention to provide an LCD backlight inverter, and more particularly, to a single stage converter in an LCD backlight inverter which is embodied into an integrated circuit and has an individual circuit structure for converting DC current into AC current.

According to an aspect of the invention to obtain the above object, it is provided a single stage converter in an LCD backlight inverter which includes powering passage alternating means connected between a supply voltage input terminal and a transformer for alternating a power supply passage into the first side of the transformer to allow transformation in the transformer and a plurality of lamps connected to an output terminal of the transformer, the single stage converter comprising: transformer controlling means for receiving a feedback current from the output terminal of the transformer and flowing through the lamps in the size of a stable voltage, comparing the feedback current with a dimming signal and comparing a compared value thereof with a periodically generated triangle wave to control the operation of the powering passage alternating means so as to control the operation of the transformer; shut-down judging means for receiving the feedback current from the output terminal of the transformer and flowing through the lamps in the size of a stable voltage and comparing the feedback current with a reference voltage to compare the size of the current flowing through the lamps so as to judge whether a shut-down takes place; and stabilizing means for receiving a supply voltage inputted through the supply voltage input terminal and comparing the supply voltage with the reference voltage to judge whether the supply voltage is in an overvoltage state so as to recognize the supply voltage as in the overvoltage state, and if it is judged that the shut-down generation judging means judges that the shut-down occurs, providing a judgment signal into the transformer controlling means to adaptively correspond to the shut-down or the overvoltage state.

The single stage converter in an LCD backlight inverter according to the invention is characterized in that the shut-down judging means and the stabilizing means are connected in series, and generally in parallel between the supply voltage input terminal and a feedback current input terminal.

The single stage converter in an LCD backlight inverter according to the invention is characterized in that the shut-down judging means comprises: a first comparator for receiving the feedback current from the output terminal of the transformer and flowing through the lamps in the size of stable voltage into an inversion input terminal thereof and receiving the reference voltage into a non-inversion input terminal to provide a compared value into the stabilizing means; a first transistor for dividing a voltage according to the feedback current and performing on/off operations according to the divided voltage; a second comparator for comparing the voltage applied to the non-inversion input terminal and the voltage applied to the inversion input terminal, the voltage applied to the non-inversion input terminal fluctuating according to the on/off operations of the first transistor; and a latch for outputting or non-outputting an initial bias voltage, which is applied to the input terminal synchronized to fluctuation of the compared value from the second comparator, via the output terminal to maintain or smoothen the periodical triangle wave.

The single stage converter in an LCD backlight inverter according to the invention is characterized in that the stabilizing means comprises: a third comparator for dividing the reference voltage via a plurality of resistances, receiving the divided voltage into a non-inversion terminal, and receiving the supply voltage inputted via the supply voltage input terminal into a non-inversion terminal to compare the divided voltage with the supply voltage and output a signal of compared value via an output terminal, wherein the output signal returns to the inversion terminal; and voltage transforming means for transforming the output signal from the shut-down judging means into a stable voltage and inputting the stable voltage into the non-inversion terminal of the third comparator.

The single stage converter in an LCD backlight inverter according to the invention is characterized in that the voltage transforming means comprises: a second transistor for receiving an output signal from the shut-down judging means into a base terminal; a third transistor having a collector terminal commonly bound to the second and third transistors and a base terminal having a common potential with the collector terminal; a fourth transistor having the base terminal commonly bound to the third transistor and an emitter terminal connected to a ground terminal; a fifth transistor having a collector terminal connected to the collector terminal of the fourth transistor, an emitter terminal applied with the supply voltage and a base terminal having a common potential with the collector terminal; a sixth transistor having the base terminal commonly bound to the fifth transistor and a common emitter terminal applied with the supply voltage; a seventh transistor having a collector terminal applied with the supply voltage, a base terminal connected to the collector terminal of the sixth transistor via a resistance and an emitter terminal connected to the non-inversion terminal of the third comparator; and a Zener diode having a cathode diode connected to the base terminal of the seventh transistor and an anode terminal connected to the ground terminal.

According to another aspect of the invention to obtain the above object, it is provided a single stage converter in an LCD backlight inverter which includes powering passage alternating means connected between a supply voltage input terminal and a transformer for alternating a power supply passage into the first side of the transformer to allow transformation in the transformer and a plurality of lamps connected to an output terminal of the transformer, the single stage converter comprising: transformer controlling means for receiving a feedback current from the output terminal of the transformer and flowing through the lamps in the size of a stable voltage, comparing the feedback current with a dimming signal and comparing a compared value thereof with a periodically generated triangle wave to control the operation of the powering passage alternating means so as to control the operation of the transformer; shut-down judging means for receiving the feedback current from the output terminal of the transformer and flowing through the lamps in the size of a stable voltage and comparing the feedback current with a reference voltage to compare the size of the current flowing through the lamps so as to judge whether a shut-down takes place; and stabilizing means for receiving a supply voltage inputted through the supply voltage input terminal and comparing the supply voltage with the reference voltage to judge whether the supply voltage is in an overvoltage state so as to recognize the supply voltage as in the overvoltage state, and if it is judged that the shut-down generation judging means judges that the shut-down occurs, providing a judgment signal into the transformer controlling means to adaptively correspond to the shut-down or the overvoltage state, wherein the transformer controlling means, the shut-down judging means and the stabilizing means are embodied in one chip.

BRIEF DESCRIPTION OF THE DRAWINGS

The above objects and several advantages of the invention will be more clearly understood to those skilled in the art from the following preferred embodiment of the invention in reference to the accompanying drawings, in which.

DETAILED DESCRIPTION OF THE PREFERRED EMBODIMENT

The following detailed description will present a preferred embodiment of the invention in reference to the accompanying drawings.

Figure 1:
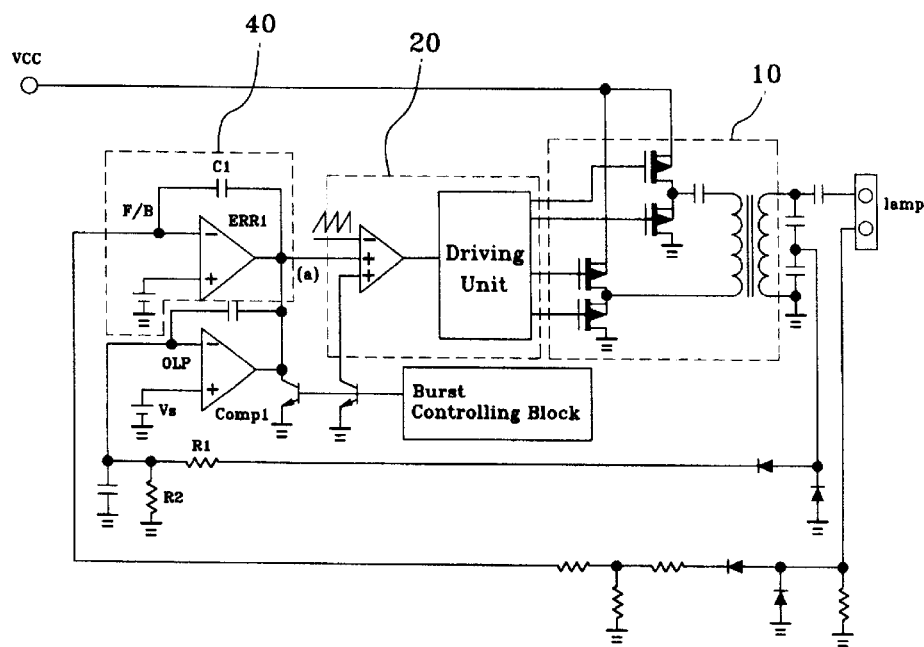
FIG. 1 illustrates a structure of a general single stage type LCD backlight inverter.
Figure 2:
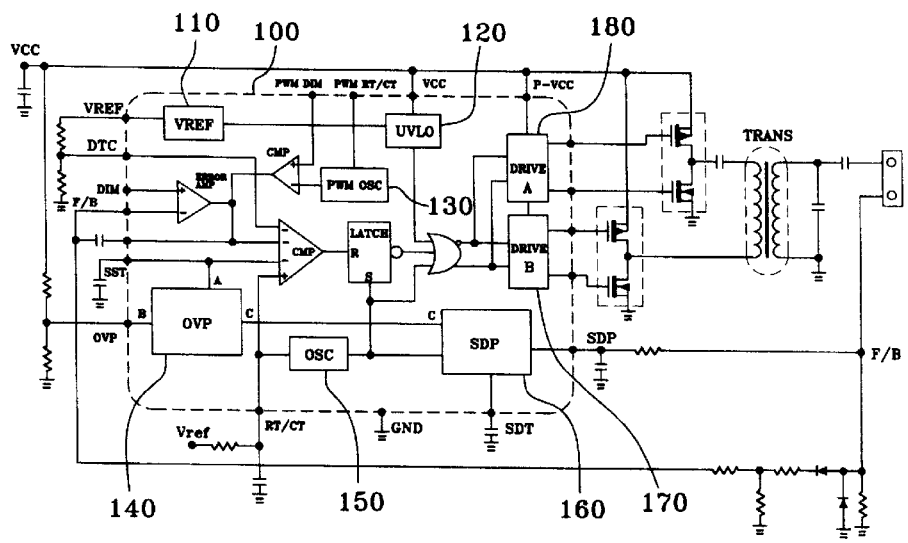
FIG. 2 illustrates a structure of a single state type LCD backlight inverter of the invention.

FIG. 2 illustrates a structure of a single stage type LCD backlight inverter of the invention, in which a component identical to the DC/AC converter 10 (FIG. 1) is called a DC/AC converter even though it is designated with no reference number in FIG. 2.

The operational features about each component shown in FIG. 2 will be described as follows: When a supply voltage is applied to a UVLO 120, a VREF 110 generates a stable bias voltage and supplies the same to each of components shown in FIG. 2.

Then, the each component functions a normal operation.

Then, the DC/AC converter turns on a downstream lamp to light up. According to the lighting or non-lighting operation of the lamp, a current flowing through the lamp undergoes feedback via a plurality of resistances and diodes to be introduced into an inversion terminal of an error amplifier ERROR AMP.

In this case, the error amplifier ERROR AMP compares the quantity of the current introduced into the inversion terminal with a dimming signal DIM inputted into a non-inversion terminal to output a compared value as an output signal. The output signal of the error amplifier ERROR AMP is introduced into the first inversion (−) terminal of the second comparator CMP2, which compares the signal introduced into the first inversion (−) signal with a triangular wave generated from an OSC 150 and introduced into a non-inversion (+) terminal so as to input a compared value thereof into an RS latch block (designated with no reference number).

The signal outputted from the second comparator CMP2 is characterized in adjusting a duty ratio of a pulse for controlling the operation of a bridge-type MOS-FET constituting the DC/AC converter. The signal from the second comparator is provided to drives 180 and 170 via the latch block, and the operation of the drives 180 and 170 incurs the operation of the MOS-FET.

In addition, in order to carry out burst dimming, a Pulse Wave Modulation oscillator (PWM OSC) 130 is internally loaded to control output of the error amplifier ERROR AMP. A Shut-Down Protection (SDP) 160 functioning as a protection circuit in response to a lamp open operation or an abnormal operation detects whether a feedback current F/B flows or not. If the feedback current does not flow, an Over Voltage Protection (OVP) 140 is controlled to protect a system.

Further, the OVP 140 confirms whether the original power supply VCC is in an overvoltage state in addition to a warning signal inputted in the SDP 160 and accordingly provides a protection signal to the second inversion terminal (−) of the second comparator CMP2 for compensating the duty ratio so as to adjust the state of voltage applied to the downstream lamp.

Figure 3:
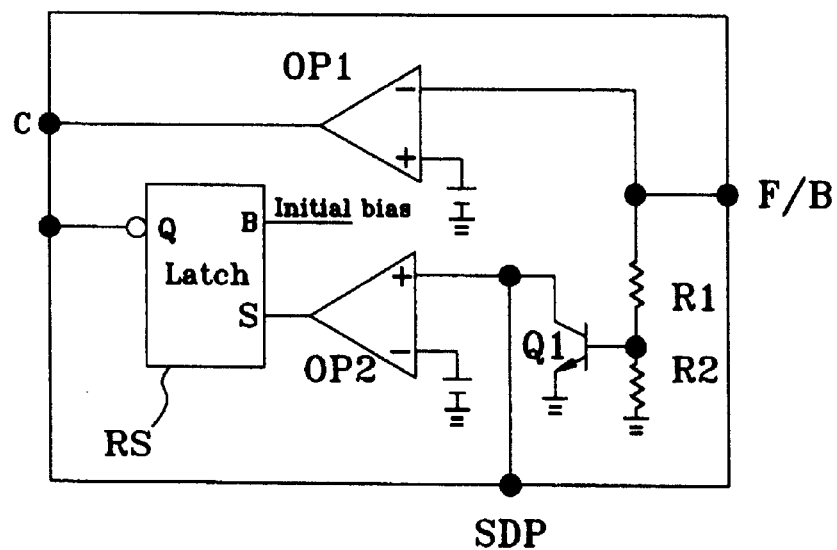
FIG. 3 illustrates a detailed structure of a shut-down protection block shown in FIG. 2.

The SDP 160 has a detailed structure as shown in FIG. 3, in which the feedback current F/B flown through the lamp in response to the lighting or non-lighting operation of the lamp is divided via resistances R1 and R2 after stabilized via a resistance and a condenser as shown in FIG. 3.

Further, the original voltage, which is not divided via the resistances R1 and R2, is compared with a reference voltage in a comparator OP1 so as to detect whether the lamp performs the lamp open operation or the abnormal operation. Therefore, when the lamp open takes place, the feedback current F/B does not flow so that the output signal of the comparator OP1 is switched into a high state.

Further, due to the state of the voltage divided via the resistances R1 and R2, a transistor Q1 performs an on/off operation. In response to the on/off operation of the transistor Q1, an output signal of a comparator OP2 is varied into low/high states.

Therefore, an output signal of a latch RS synchronous to variation of the output signal of the comparator OP2 uses an initial bias. In this case, the triangle wave of the OSC 150 is smoothened.

Figure 4:
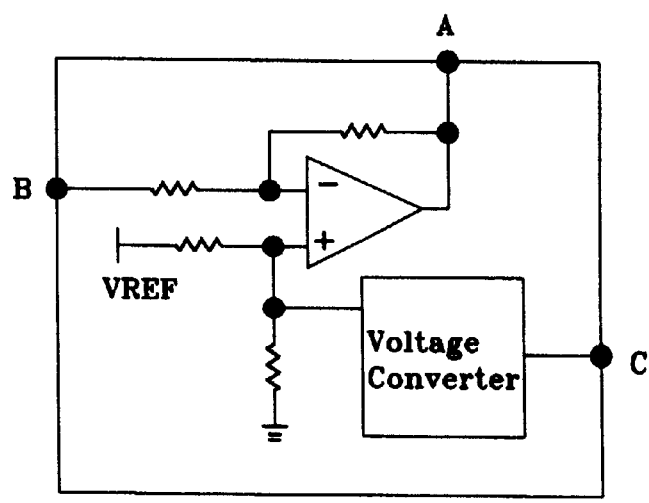
FIG. 4 illustrates a structure of an overvoltage protection block shown in FIG. 2.
Figure 5:
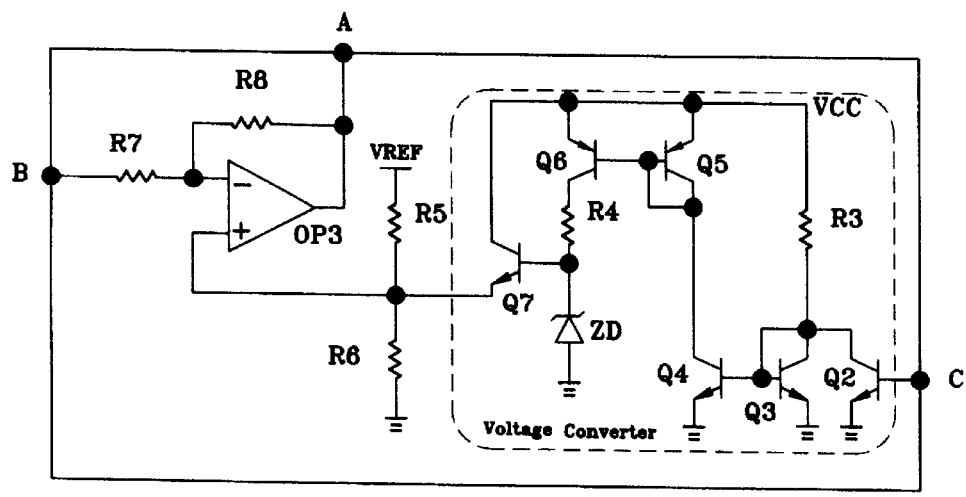
FIG. 5 illustrates a detailed structure of a circuit shown in FIG. 4.
Figure 6:
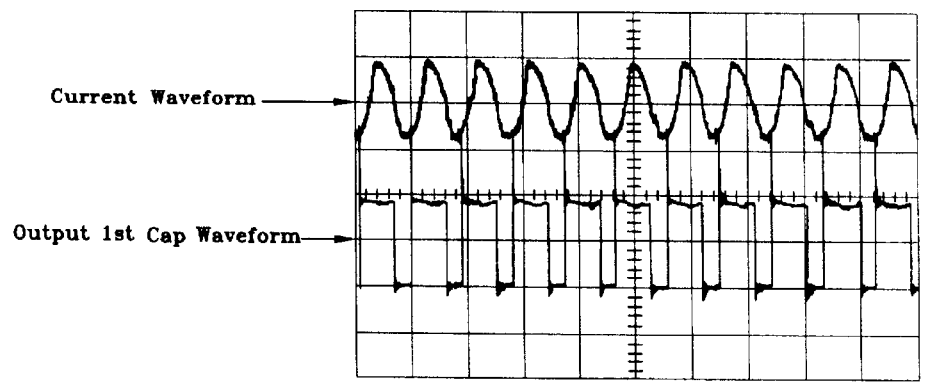
FIGS. 6 to 10 illustrate waveforms according to partial operations of a single stage type LCD backlight inverter according to the invention.
Figure 7:
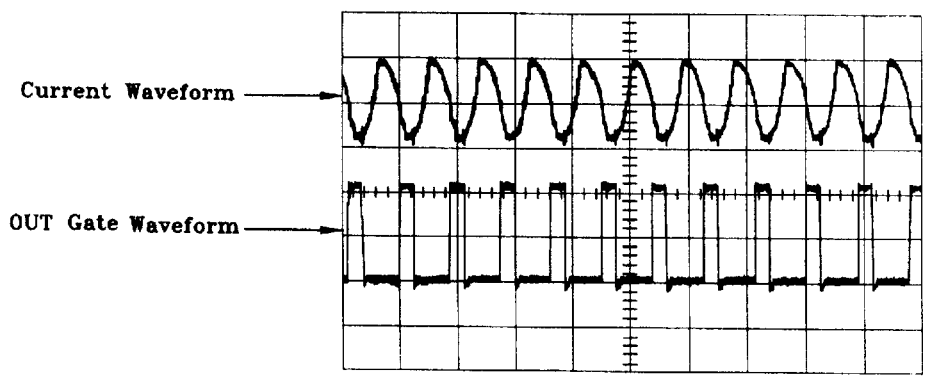
Figure 8:
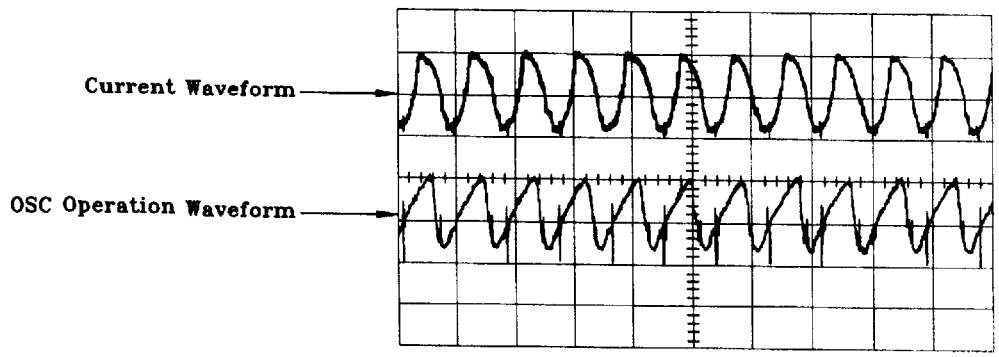
Figure 9:
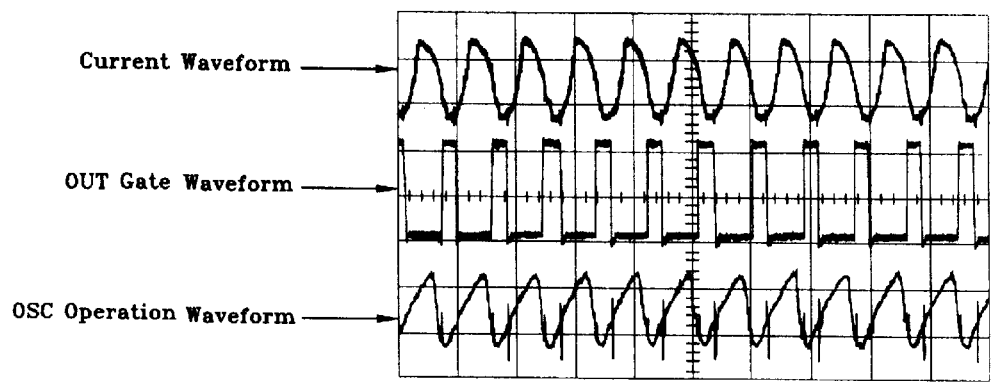
Figure 10:
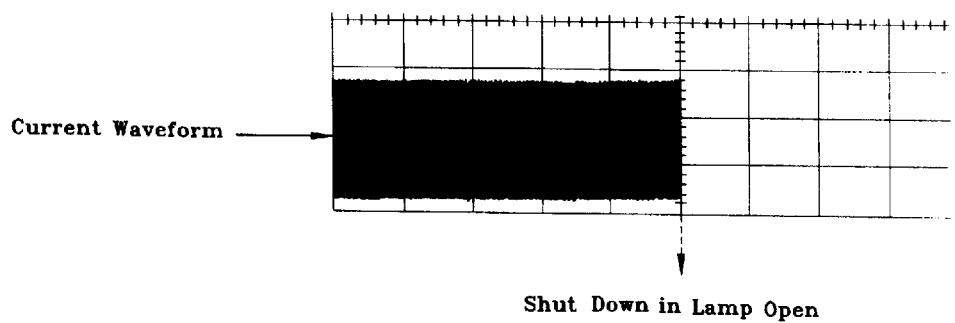

Hereinafter it will be simply described about a structure of the OVP 140 receiving the output signal from the above SDP block as shown in FIG. 4, and a detailed circuit structure is as shown in FIG. 5.

Therefore, describing the operation of the OVP block in reference to FIG. 5, a transistor Q2 receiving the output signal of the SDP 160 turns on if the output signal of the SDP 160 has a high state.

This turns off a transistor Q3 having a collector terminal, which is commonly bound to the transistors Q2 and Q3, and a base terminal bound to the collector. Since all voltage is applied to both ends of a resistance R3, a ground voltage is applied to the collector terminal and the base terminal of the transistor Q3.

This also turns off a transistor Q4 having the base terminal which is commonly bound to the transistors Q3 and Q4. As the transistor Q4 turns off, a high impedance state is maintained to a base terminal of a transistor Q5 so as to turn on a transistor Q6 having the base terminal which is commonly bound to the transistors Q5 and Q6.

As the transistor Q6 turns on, a driving voltage VCC flows through a resistance R4 and a Zener diode ZD so that a transistor Q7 turns on.

Therefore, the voltage at a dividing point of resistances R5 and R6 dividing a reference voltage VREF is fluctuated and the amount of fluctuation changes the output signal of a comparator OP3 so that an output signal of the second comparator CMP2 is fluctuated to actually control the operation of drives 170 and 180 thereby protecting the shut down operation and carrying out a normal operation.

Further, the driving voltage VCC is divided through resistances (designated with no reference number) and then inputted into an inversion data input terminal of a comparator OP3 via the seventh resistance R7. If it is judged that an overvoltage is inputted compared the reference voltage inputted into the non-inversion input terminal, an output signal of the comparator OP3 is fluctuated. This changes the output signal of the second comparator CMP2 to actually control the operation of drives 170 and 180 thereby protecting an overvoltage and carrying out the normal operation.

FIGS. 6 to 10 illustrate waveforms according to partial operations of a single stage type LCD backlight inverter according to the invention.

Although the preferred embodiment of the invention has been illustrated and described, it will be clear to those skilled in the art that various modifications and variations can be made without departing from the scope and spirit of the invention as disclosed in the accompanying claims.

The single stage converter of the LCD backlight inverter of the invention operating as above is characterized in that the inputted supply voltage has a wide area, and in that the operation of the OVP is voltage controlled at a specific output voltage or more by forcibly controlling the PWM duty ratio of the output driving block in the operation range of the output transformer according to the fluctuation of the supply voltage.

Therefore, the single stage converter in the LCD backlight inverter of the invention is embodied as an ASIC to realize an individual application circuit, replaces conventional two-stage articles to reduce the size, enhances the efficiency and reduces the part number thereby saving the cost for materials.

What is claimed is:

1. A single stage converter in an LCD backlight inverter which includes powering passage alternating means connected between a supply voltage input terminal and a transformer for alternating a power supply passage into the first side of the transformer to allow transformation in the transformer and a plurality of lamps connected to an output terminal of the transformer, the single stage converter comprising:

a transformer controller receiving a feedback current from the output terminal of the transformer and flowing through the lamps, comparing the feedback current with a dimming signal and comparing a compared value thereof with a periodically generated triangle wave to control the operation of the powering passage alternating means so as to control the operation of the transformer;

shut-down judging means for receiving the feedback current from the output terminal of the transformer flowing through the lamps and comparing the feedback current with a reference voltage to compare the size of the current flowing through the lamps so as to judge whether a shut-down takes place; and a stabilizer receiving a supply voltage inputted through the supply voltage input terminal and comparing the supply voltage with the reference voltage to judge whether the supply voltage is in an overvoltage state, and if judging means judges that the shut-down occurs, providing a judgment signal into the transformer controlling means to adaptively correspond to the shut-down or the overvoltage state;

wherein the shut-down judging means and the stabilizer are connected in series, and generally connected in parallel between the supply voltage input terminal and a feedback current input terminal.

2. The single stage converter in an LCD backlight inverter according to claim 1, wherein the shut-down judging means comprises:

a first comparator for receiving the feedback current from the output terminal of the transformer and flowing through the lamps into an inversion input terminal thereof and receiving the reference voltage into a non-inversion input terminal to provide a compared value into the stabilizing means;

a first transistor for dividing a voltage according to the feedback current and performing on/off operations according to the divided voltage;

a second comparator for comparing the voltage applied to the non-inversion input terminal and the voltage applied to the inversion input terminal, the voltage applied to the non-inversion input terminal fluctuating according to the on/off operations of the first transistor; and a latch for outputting or non-outputting an initial bias voltage, which is applied to the input terminal synchronized to fluctuation of the compared value from the second comparator, via the output terminal to maintain or smoothen the periodical triangle wave.

3. The single stage converter in an LCD backlight inverter according to claim 1, wherein the stabilizer comprises:

a third comparator for dividing the reference voltage via a plurality of resistances, receiving the divided voltage into a non-inversion terminal, and receiving the supply voltage inputted via the supply voltage input terminal into a non-inversion terminal to compare the divided voltage with the supply voltage and output a signal of compared value via an output terminal, wherein the output signal returns to the inversion terminal; and a voltage conditioner transforming the output signal from the shut-down judging means into a stable voltage and inputting the stable voltage into the non-inversion terminal of the third comparator.

4. The single stage converter in an LCD backlight inverter according to claim 3, wherein the voltage conditioner comprises:

a second transistor for receiving an output signal from the shut-down judging means into a base terminal;

a third transistor having a collector terminal commonly bound to the second and third transistors and a base terminal having a common potential with the collector terminal;

a fourth transistor having the base terminal commonly bound to the third transistor and an emitter terminal connected to a ground terminal;

a fifth transistor having a collector terminal connected to the collector terminal of the fourth transistor, an emitter terminal applied with the supply voltage and a base terminal having a common potential with the collector terminal;

a sixth transistor having the base terminal commonly bound to the fifth transistor and a common emitter terminal applied with the supply voltage;

a seventh transistor having a collector terminal applied with the supply voltage, a base terminal connected to the collector terminal of the sixth transistor via a resistance and an emitter terminal connected to the non-inversion terminal of the third comparator; and a Zener diode having a cathode diode connected to the base terminal of the seventh transistor and an anode terminal connected to the ground terminal.

* * * * *